United States Patent
Roessler et al.

(10) Patent No.: US 7,053,369 B1
(45) Date of Patent: May 30, 2006

(54) SCAN DATA COLLECTION FOR BETTER OVERALL DATA ACCURACY

(75) Inventors: Kenneth Roessler, Boca Raton, FL (US); Dong Chen, San Jose, CA (US)

(73) Assignee: Rave LLC, Delray Beach, FL (US)

( * ) Notice: Subject to any disclaimer, the term of this patent is extended or adjusted under 35 U.S.C. 154(b) by 310 days.

(21) Appl. No.: 10/274,669

(22) Filed: Oct. 18, 2002

Related U.S. Application Data (60) Provisional application No. 60/359,271, filed on Oct. 19, 2001.

(51) Int. Cl.
G01N 13/16 (2006.01)

(52) U.S. Cl. .................. 250/306; 250/234; 73/105

(58) Field of Classification Search .............. 250/306, 250/307; 73/105
See application file for complete search history.

(56) References Cited

U.S. PATENT DOCUMENTS

| | | |
|---|---|---|
| 3,586,865 A | 6/1971 | Baker et al. |
| 3,812,288 A | 5/1974 | Walsh et al. |
| 4,115,806 A | 9/1978 | Morton |
| 4,604,520 A | 8/1986 | Pohl |
| 4,672,559 A | 6/1987 | Jansson et al. |
| 4,673,477 A | 6/1987 | Ramalingam et al. |
| RE32,457 E | 7/1987 | Matey |
| 4,681,451 A | 7/1987 | Guerra et al. |
| 4,697,594 A | 10/1987 | Mayo, Jr. |
| 4,793,201 A | 12/1988 | Kanai et al. |
| 4,831,614 A | 5/1989 | Duerig |
| 4,866,986 A | 9/1989 | Cichanski |
| 4,907,195 A | 3/1990 | Kazan et al. |
| 4,924,091 A | 5/1990 | Hansma et al. |
| 4,954,704 A | 9/1990 | Elings et al. |
| 4,999,495 A | 3/1991 | Miyata et al. |
| 5,001,344 A | 3/1991 | Kato et al. |
| 5,010,249 A | 4/1991 | Nishikawa |
| 5,015,850 A | 5/1991 | Zdeblick |
| 5,018,865 A | 5/1991 | Ferrell et al. |
| 5,025,346 A | 6/1991 | Tang |
| 5,038,322 A | 8/1991 | Van Loenen |
| 5,043,577 A | 8/1991 | Pohl |
| 5,047,633 A | 9/1991 | Finlan et al. |
| 5,047,649 A | 9/1991 | Hodgson et al. |
| 5,072,116 A | 12/1991 | Kawade et al. |
| 5,081,390 A | 1/1992 | Elings et al. |
| 5,105,305 A | 4/1992 | Betzig et al. |
| 5,107,112 A | 4/1992 | Yanagisawa et al. |

(Continued)

FOREIGN PATENT DOCUMENTS

EP     0325056     7/1989

(Continued)

OTHER PUBLICATIONS

Ager et al., "Multilayer hard carbon films with low wear rates," *Surface and Coatings Technology*, 91:91-94 (1997).

(Continued)

*Primary Examiner*—Nikita Wells
*Assistant Examiner*—James J. Leybourne
(74) *Attorney, Agent, or Firm*—Townsend and Townsend and Crew LLP (57) ABSTRACT

A scan data collection operation includes performing a scanning operation using a scan path that includes a directional component that is additional to a data collection directional component. The collected scan data is mapped to another set of locations, thus allowing for detection of surface features using fewer scans.

21 Claims, 10 Drawing Sheets

U.S. PATENT DOCUMENTS

| | | | |
|---|---|---|---|
| 5,108,865 A | 4/1992 | Zwaldo et al. |
| 5,118,541 A | 6/1992 | Yamamoto et al. |
| 5,138,159 A | 8/1992 | Takase et al. |
| 5,142,145 A | 8/1992 | Yasutake |
| 5,148,308 A | 9/1992 | Miyauchi |
| 5,155,589 A | 10/1992 | Gere |
| 5,166,520 A | 11/1992 | Prater et al. |
| 5,187,367 A | 2/1993 | Miyazaki |
| RE34,214 E | 4/1993 | Carlsson et al. |
| 5,210,410 A | 5/1993 | Barret |
| 5,216,631 A | 6/1993 | Sliwa |
| 5,220,555 A | 6/1993 | Yanagisawa |
| 5,231,286 A | 7/1993 | Kajimura et al. |
| 5,241,527 A | 8/1993 | Eguchi |
| 5,249,077 A | 9/1993 | Laronga |
| 5,254,209 A | 10/1993 | Schmidt et al. |
| 5,254,854 A | 10/1993 | Betzig |
| 5,260,824 A | 11/1993 | Okada et al. |
| 5,276,672 A | 1/1994 | Miyazaki |
| 5,278,704 A | 1/1994 | Matsuda |
| 5,283,437 A | 2/1994 | Greshner et al. |
| 5,289,004 A | 2/1994 | Okada et al. |
| 5,289,408 A | 2/1994 | Mimura |
| 5,297,130 A | 3/1994 | Tagawa |
| 5,299,184 A | 3/1994 | Yamano |
| 5,302,239 A | 4/1994 | Roe et al. |
| 5,308,974 A | 5/1994 | Elings et al. |
| 5,317,152 A | 5/1994 | Takamatsu |
| 5,317,533 A | 5/1994 | Quate |
| 5,319,961 A | 6/1994 | Matsuyama et al. |
| 5,319,977 A | 6/1994 | Quate et al. |
| 5,322,735 A | 6/1994 | Fridez et al. |
| RE34,708 E | 8/1994 | Hansma et al. |
| 5,338,932 A | 8/1994 | Theodore et al. |
| 5,343,460 A | 8/1994 | Miyazaki |
| 5,349,735 A | 9/1994 | Kawase |
| 5,353,632 A | 10/1994 | Nakagawa |
| 5,354,985 A | 10/1994 | Quate |
| 5,357,109 A | 10/1994 | Kusumoto |
| 5,357,110 A | 10/1994 | Statham |
| 5,360,977 A | 11/1994 | Onuki et al. |
| 5,362,963 A | 11/1994 | Kopelman et al. |
| 5,373,494 A | 12/1994 | Kawagishi |
| 5,389,475 A | 2/1995 | Yanagisawa |
| 5,392,275 A | 2/1995 | Kawada et al. |
| 5,393,647 A | 2/1995 | Neukermans et al. |
| 5,396,483 A | 3/1995 | Matsuda |
| 5,408,094 A | 4/1995 | Kajimura |
| 5,412,641 A | 5/1995 | Shinjo |
| 5,414,260 A | 5/1995 | Takimoto et al. |
| 5,414,690 A | 5/1995 | Shido et al. |
| 5,416,331 A | 5/1995 | Ichikawa et al. |
| 5,418,363 A * | 5/1995 | Elings et al. ............... 250/306 |
| 5,426,631 A | 6/1995 | Miyazaki et al. |
| 5,453,970 A | 9/1995 | Rust et al. |
| 5,455,420 A | 10/1995 | Ho et al. |
| 5,461,605 A | 10/1995 | Takimoto |
| 5,463,897 A | 11/1995 | Prater et al. |
| 5,471,458 A | 11/1995 | Oguchi et al. |
| 5,472,881 A | 12/1995 | Beebe et al. |
| 5,490,132 A | 2/1996 | Yagi et al. |
| 5,495,109 A | 2/1996 | Lindsay et al. |
| 5,496,999 A * | 3/1996 | Linker et al. ............... 250/306 |
| 5,502,306 A | 3/1996 | Meisburger et al. |
| 5,506,829 A | 4/1996 | Yagi |
| 5,510,615 A | 4/1996 | Ho et al. |
| 5,519,686 A | 5/1996 | Yanagisawa et al. |
| 5,548,117 A | 8/1996 | Nakagawa |
| 5,559,328 A | 9/1996 | Weiss et al. |
| 5,560,244 A | 10/1996 | Prater et al. |
| 5,583,286 A | 12/1996 | Matsuyama |
| 5,602,820 A | 2/1997 | Wickramasinghe et al. |
| 5,610,898 A | 3/1997 | Takimoto |
| 5,623,476 A | 4/1997 | Eguchi |
| 5,634,230 A | 6/1997 | Maurer |
| 5,644,512 A | 7/1997 | Chernoff et al. |
| 5,679,952 A | 10/1997 | Lutwyche et al. |
| 5,717,680 A | 2/1998 | Yamano |
| 5,721,721 A | 2/1998 | Yanagisawa |
| 5,751,683 A | 5/1998 | Kley |
| 5,756,997 A | 5/1998 | Kley |
| 5,763,879 A | 6/1998 | Zimmer et al. |
| 5,804,709 A | 9/1998 | Bougoin et al. |
| 5,821,410 A | 10/1998 | Xiang et al. |
| 5,825,670 A | 10/1998 | Chernoff et al. |
| 5,865,978 A | 2/1999 | Cohen |
| 5,874,726 A | 2/1999 | Haydon |
| 5,883,387 A | 3/1999 | Matsuyama et al. |
| 5,898,106 A * | 4/1999 | Babcock et al. ............... 73/105 |
| 5,922,214 A | 7/1999 | Liu et al. |
| 6,008,489 A * | 12/1999 | Elings et al. ............... 250/234 |
| 6,031,756 A | 2/2000 | Gimsewski et al. |
| 6,066,265 A | 5/2000 | Galvin et al. |
| 6,101,164 A | 8/2000 | Kado et al. |
| 6,144,028 A | 11/2000 | Kley |
| 6,173,604 B1 | 1/2001 | Xiang et al. |
| 6,199,269 B1 | 3/2001 | Greco et al. |
| 6,201,226 B1 | 3/2001 | Shimada et al. |
| 6,229,138 B1 | 5/2001 | Kley |
| 6,229,607 B1 | 5/2001 | Shirai et al. |
| 6,229,609 B1 | 5/2001 | Muramatsu et al. |
| 6,232,597 B1 | 5/2001 | Kley |
| 6,239,426 B1 | 5/2001 | Muramatsu et al. |
| 6,242,734 B1 | 6/2001 | Kley |
| 6,252,226 B1 | 6/2001 | Kley |
| 6,265,711 B1 | 7/2001 | Kley |
| 6,281,491 B1 | 8/2001 | Kley |
| 6,337,479 B1 | 1/2002 | Kley |
| 6,339,217 B1 | 1/2002 | Kley |
| 6,340,813 B1 | 1/2002 | Tominaga et al. |
| 6,353,219 B1 | 3/2002 | Kley |
| 6,369,379 B1 | 4/2002 | Kley |
| 6,396,054 B1 | 5/2002 | Kley |
| 6,489,611 B1 * | 12/2002 | Aumond et al. ............ 250/306 |
| 6,507,553 B1 | 1/2003 | Kley |
| 6,515,277 B1 | 2/2003 | Kley |
| 6,517,249 B1 | 2/2003 | Doll |
| 6,614,227 B1 | 9/2003 | Ookubo |
| 2001/0010668 A1 | 8/2001 | Kley |
| 2002/0007667 A1 | 1/2002 | Pohl et al. |
| 2002/0117611 A1 | 8/2002 | Kley |
| 2002/0135755 A1 | 9/2002 | Kley |
| 2003/0167831 A1 | 9/2003 | Kley |

FOREIGN PATENT DOCUMENTS

| | | |
|---|---|---|
| JP | 61-133065 | 6/1986 |
| JP | 01-262403 | 10/1989 |
| JP | 7-105580 | 4/1995 |
| WO | WO 96/03641 A1 | 2/1996 |
| WO | WO 97/04449 | 2/1997 |
| WO | WO 98/34092 A2 | 8/1998 |
| WO | WO 01/03157 | 1/2001 |
| WO | WO03/046473 | 6/2003 |
| WO | WO04/023490 | 3/2004 |

OTHER PUBLICATIONS

Betzig et al "Near-Field Optics: Microscopy Spectroscopy and Surface Modification Beyond the Diffraction Limit" Science 257:189-195 (1992).

Dai et al. "Nanotubes as nanoprobes in scanning probe microscopy," Nature 384:147-150 (1996).

Davis "Deposition characterization and device development in diamond silicon carbide and gallium nitride thin films" J. Vac. Sci. Technol. 11:829-837 (1993).

Diaz et al. "An Improved Fabrication Technique for Porous Silicon," Rev. Sci. Instrum.64: 507-509 (1993).

Jaschke et al. "Deposition of Organic Material by the Tip of a Scanning Force Microscope," Langmuir 11:1061-1064 (1995).

Givargizov et al "Growth of diamond particles on sharpened silicon tips" Materials Letters 18:61-63 (1993).

Gomyou et al. "Effect of Electrochemical Treatments on the Photolimunescence from Porous Silicon," J. Electrochem. Soc. 139: L86-L88 (1992).

Nossarzewska-Orlowska et al. "Photoluminescence Properties of Porous Silicon Prepared by Electrochemical Etching of Si Epitaxial Layer," Acta Physica Polonica A 84:713-716 (1993).

Rasmussen et al. "Fabrication of an All-metal Atomic Force Microscope Probe," IEEE Procedings of the International Conference on Solid State Sensors and Actuators, Chicago, (1997).

Rossow et al. "Influence of the Formation Conditions on the Microstructure of Porous Silicon Layers Studied by Spectroscopic Ellipsometry," Thin Solid Films 255:5-8 (1995).

Smestad et al. "Photovoltaic Response in Electrochemically Prepared Photoluminescent Porous Silicon," Solar Energy Materials and Solar Cells 26:277-283 (1992).

Tang "Electrostatic comb drive for resonant sensor and actuator applications," Abstract of dissertation at the University of California at Berkeley (1990).

Toledo-Crow et al "Near-field differential scanning optical microscope with atomic force regulation" Appl. Phys. Lett. 60:2957-42959 (1992).

Van Hulst et al "Near-field optical microscope using a silicon-nitride probe" Appl. Phys. Lett. 62:461-463 (1993).

Watson et al "The Radiation Patterns of Dielectric Rods—Experiment Theory" Journal of Applied Physics 19:661-670 (1948).

* cited by examiner

SCAN DATA COLLECTION FOR BETTER OVERALL DATA ACCURACY

CROSS-REFERENCES TO RELATED APPLICATIONS

This application claims priority from U.S. Provisional Application No. 60/359,271, filed Oct. 19, 2001 for "IMPROVED SCAN DATA COLLECTION FOR BETTER OVERALL DATA ACCURACY," the entire disclosure of which is incorporated by reference in its entirety for all purposes.

BACKGROUND OF THE INVENTION

The present invention is related generally to the field of Atomic Force Microscopy (AFM), Scanning Tunneling Microscopy (STM), Near field Scanning Optical Microscopy (NSOM), NanoSpectroPhotometry (NSP), NanoPolarimetry (NP), Magnetic Field Microscopy (MFM) and any other methods adaptable and suitable to guide the scanning and nanomachining techniques described herein. These technologies are sometimes collectively referred to as Scanning probe Microscopy (SPM). Generally, SPM technologies allow one to "see" atomic-scale features on or in surfaces. More specifically, the present invention is directed to improving the collection of data in an AFM system where a 1-dimensional or 2-dimensional cantilever tip is used to scan the surface.

An AFM works by scanning a tip over a surface much the same way as a phonograph needle scans a record. The tip is located at the end of a cantilever beam and positioned over the surface to be scanned. The combination of the cantilever beam and tip is sometimes referred to collectively as a scanning probe or simply a probe.

AFM techniques rely on the effects of the inter-atomic interactions, such as van der Waals forces, that arise between the atoms in the structure of the tip and the atoms at the surface being imaged. As the tip is attracted to the surface, the cantilever beam is deflected. The magnitudes of the deflections correspond to the topological features of the atomic structure of the surface being scanned. The AFM can work with the tip touching the sample (contact mode), or the tip can tap across the surface (tapping mode), or the tip can be controlled in such a way as not to touch the surface at all (non-contact mode).

STM techniques rely on the principle that the electron probability cloud associated with the atoms at the surface extends a very small distance above the surface as described by the quantum physical model. When a tip is brought sufficiently close to such a surface, there is an increased probability of an interaction between the electron cloud on the surface and that of the tip atom. An electric tunneling current flows when a small voltage is applied. The tunneling current is very sensitive to the distance between the tip and the surface. These changes in the tunneling current with distance as the tip is scanned over the surface are used to produce an image of the surface.

Figure 9A:
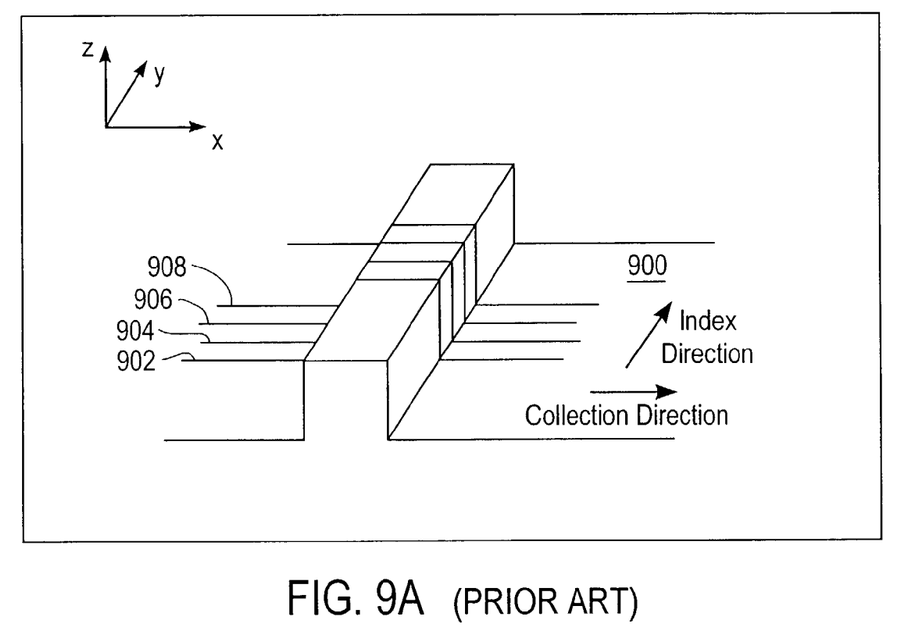
FIGS. 9A–9D show conventional scanning.

The conventional method of scanning traces a path over the surface along a direction which conventionally is referred to as the X-direction (X axis). A scanning tip is adjusted Z-direction (Z axis) for each scan line, up or down relative to the surface in response to the hills and valleys present on the surface. The scanning is performed for a predetermined distance along the X-direction. The tip is then returned to roughly the initial X axis position and then indexed to the next Y-direction (Y axis) position, and the motion is repeated. This operation is commonly referred to as a raster scan and is shown in FIG. 9A by scan lines 902, 904, 906, and 908.

With conventional scanning in an AFM, the system collects the data in a single 'slice' of the surface. If there is a local effect (indention or extension) on the surface, it will cause a change in the information collected about the surface, depending on the number of line samples collected. For example, a surface feature can be missed if there are too few scan lines. A corollary to this observation is that a surface feature can be missed if the indexing between two scan lines is greater than a dimension of the surface feature along the indexing direction.

Figure 9B:
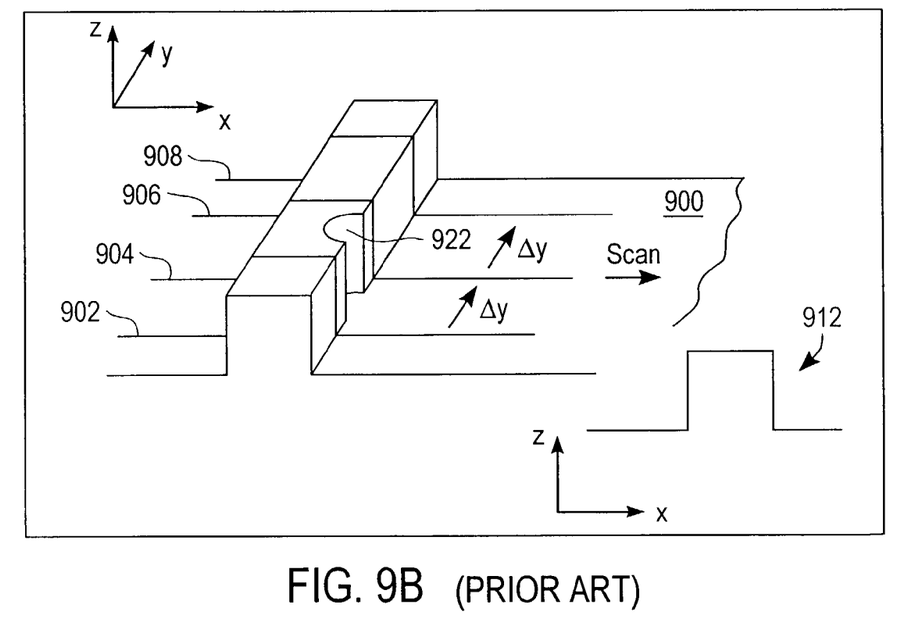
Figure 9C:
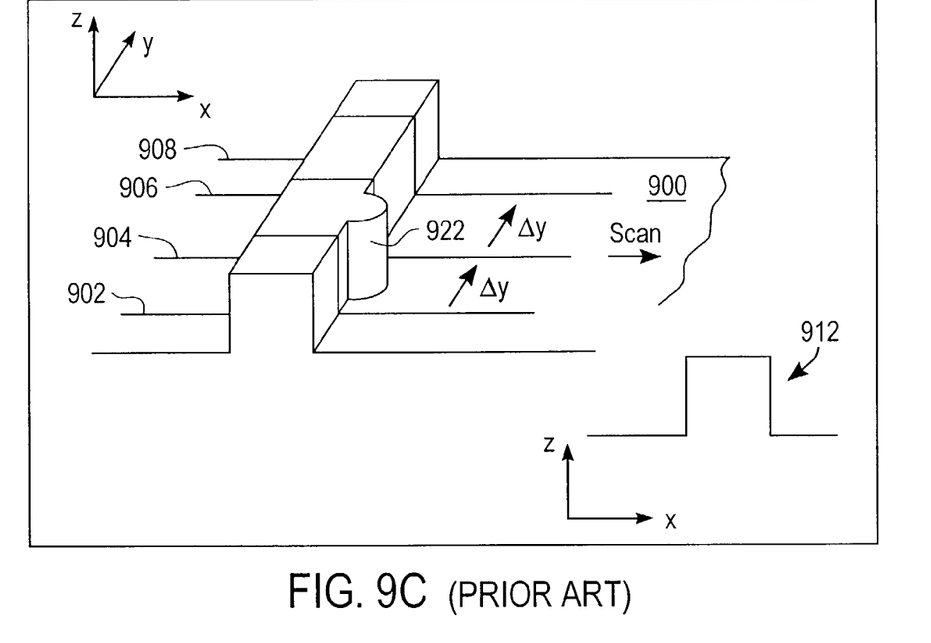

Consider the conventional scans of a surface 900 shown in FIGS. 9B and 9C, for example. The scan lines 902, 904, 906, and 908 are shown spaced apart by an index amount of $\Delta y$. Data is collected along the indicated scan direction. The profiles 912 illustrate a typical measurement that is collected, namely, height measurements in the Z-direction relative to a reference height, such as an area on the surface being scanned. These figures illustrate a situation where the scan line spacing is sufficiently wide as to miss a surface feature 922 (e.g., a dent in FIG. 9B and a bump in FIG. 9C). This can be especially disadvantageous during an inspection operation where the surface feature is an anomalous structure that should be detected.

The conventional solution is to perform a scans with smaller index steps. This requires that greater numbers of line samples be taken to insure that the local surface effects are included in the information about that surface. However in a scanning operation, the largest contributor of throughput is the time it takes to perform a scan and particularly the time it takes to scan in the indexing direction in preparation for the next scan. Thus, while increasing the number of scans ensures detection of surface features, this comes at the cost of greatly increased scan time.

Figure 9D:
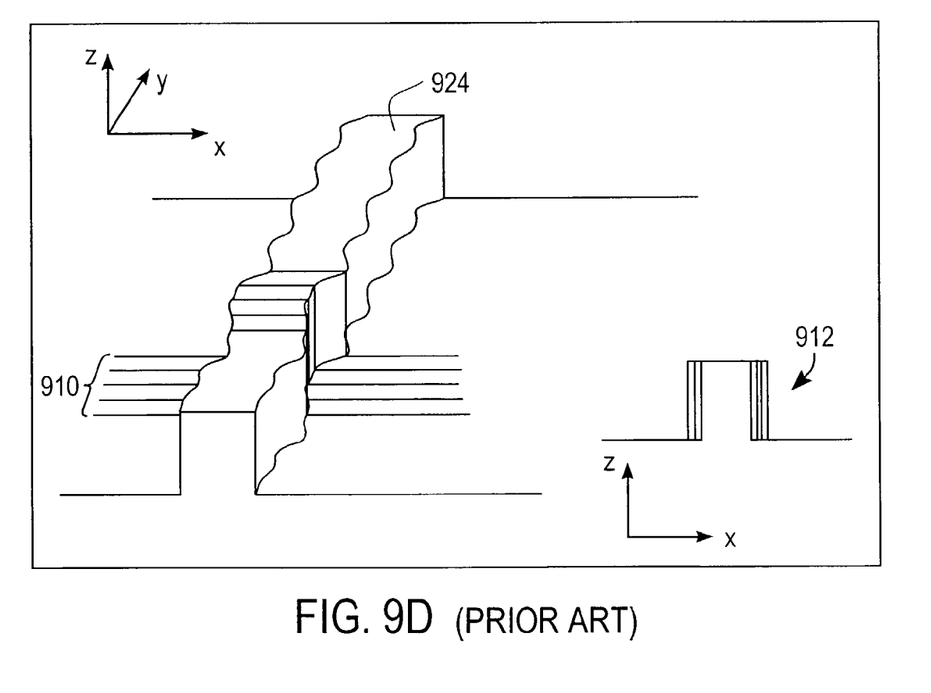

As can be seen in FIG. 9D, a number of scan lines 910 are needed to collect up the variations on surfaces of a sidewall feature 924. This figure shows both the surfaces being scanned and a corresponding set of superimposed scan lines showing a profile of the detected variations of the surface. An analysis of this surface would require that these variations be taken into account to best detect such features, which again requires an increased number of scan lines, thus increasing the time to perform the operation.

There is a need to improve the speed of scanning while still being able to detect surface features.

BRIEF SUMMARY OF THE INVENTION

In a simplified example of an embodiment of the present invention, a scan data collection operation includes moving a probe tip in a direction that is not a straight line with the respect to the data collection direction. Rather, the probe tip is moved in a motion that adds an additional directional component to the motion when scanning in a first direction. Information relating to the additional directional component can be discarded, leaving only the first direction component and the measurement made by the probe.

In accordance with a simple example implementation of the invention, the core stepping motion in the collection direction is altered to include an additional micro step that moves the positioning system in the indexing direction. Parameters that indicate the shape of the move, and the amplitude of the move, the index rate of the move, and the zero point of the move function can be specified.

BRIEF DESCRIPTION OF THE DRAWINGS

A further understanding of the nature and advantages of the present invention may be realized by reference to the remaining portions of the specification and the following drawings where.

DETAILED DESCRIPTION OF THE INVENTION

Note in the discussion which follows, that the Y-coordinate is used to denote the indexing direction and the X-coordinate denotes the "collection direction" or "sampling axis." Data collected at each sampling location on a surface to be scanned can be any physical measurement. It can be assumed without loss of generality that the data collected is height data, which is represented in the Z-axis. This axis notation is merely a conventionally practiced frame of reference that is convenient for the following discussion.

Figure 1:
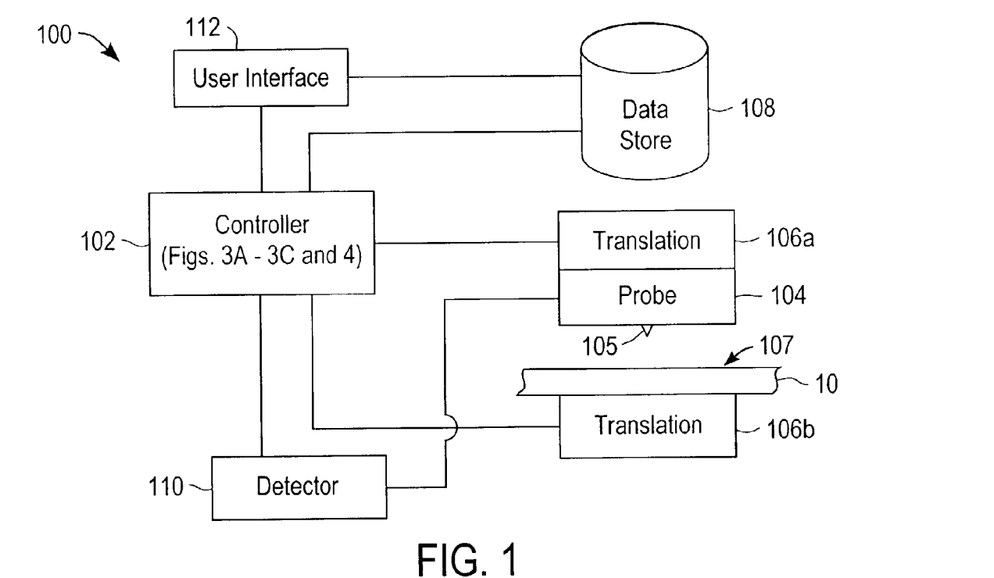
FIG. 1 shows a high level generalized block diagram of an example of an AFM scanning system in accordance with the present invention.

FIG. 1 is a generalized diagram illustrating a typical SPM system 100. A scanning probe 104 is the workhorse of the SPM. Though shown schematically, it can be appreciated that a typical probe comprises a cantilever (not shown) and a tip 105 disposed at a free end of the cantilever. Various tip shapes and configurations suitable for scanning and nanomachining are known and one of ordinary skill in the relevant arts will appreciate that the tip selection will depend on the data to be collected or, more generally, on the operation to be performed during scanning.

The probe 104 can be coupled to a first translation stage 106a. The first translation stage can provide movement of the probe in the X-Y plane. By convention, the X-Y plane is the plane parallel to a major surface 107 of a workpiece 10. Thus, the probe can be positioned in the X-Y position relative to the workpiece by the first translation stage. The first translation stage can also provide movement of the probe in the Z-direction and thus position the probe in three-dimensional space relative to the workpiece. Such first translation stages are known and well understood devices. Typically, they are piezoelectric devices.

Alternatively or in addition, a second translation stage 106b can be provided. The workpiece 10 can be affixed to the second translation stage to provide X-Y motion of the workpiece relative to the probe 104. Furthermore, the second translation stage can provide motion of the workpiece in the Z direction relative to the probe. Such stages are typically linear motors, or precision ball screw stages or combinations thereof with linear scale or interferometric position feedback.

The relative motion between the probe 104 and the workpiece 10 can be achieved by any of a number of techniques. The probe can be translated in three dimensions while maintaining the workpiece in a stationary position. Conversely, the workpiece can move relative to a stationary probe. Still another technique is to move both the probe and the workpiece in a coordinated fashion to achieve rapid positioning. The first translation stage 106a might provide only X-Y motion, while Z-axis positioning is provided by the second translation stage 106b; or vice-versa. It can be appreciated that these and still other combinations of concerted motions of the probe and the workpiece can be performed to effect relative motion between the probe and the workpiece.

A detection module 110 is operatively coupled to detect signals received from the scan probe 104. Many detection techniques are known. For example, if the probe is operated in AFM (atomic force microscopy) mode, the cantilever resonance point is shifted by the interatomic forces acting between the tip and the surface as the tip is scanned across the surface. A generalized controller 102 can be configured to provide various computer-based functions such as controlling the components of the system 100, performing data collection and subsequent analysis, and so on. Typically, the controller is some computer-based device; for example, common architectures are based on a microcontroller, or a general purpose CPU, or even a custom ASIC-based controller. As will be explained, the controller can be configured to control scanning operations in accordance with the present invention.

A user interface 112 is provided to allow a user to interact with the system. The "user" can be a machine user, in addition to conventional human users. A machine interface might be appropriate in an automated environment where control decisions are provided by a machine.

A data store 108 contains various information to facilitate scanning and nanomachining operations and to provide generally for overall operation of the system 100. The data store can contain the programming code that executes on the controller 102. The data store shown in the figure can be any appropriate data storage technology, ranging from a single disk drive unit to a distributed data storage system on a network.

Figure 2A:
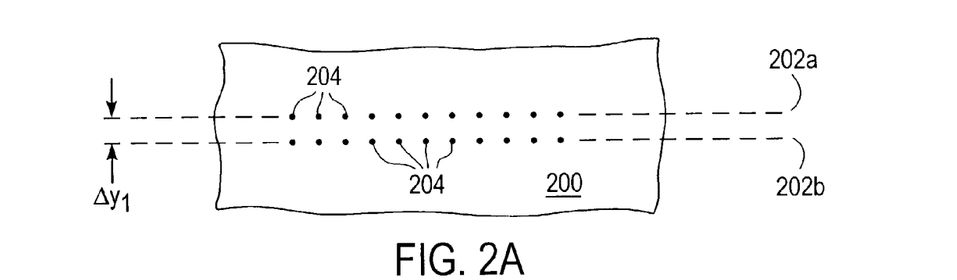
FIGS. 2A and 2B illustrate the difference between conventional scanning and a scan path according to the present invention.

FIG. 2A shows conventional scan paths 202a and 202b across a surface to be scanned 200. Data (such as height) is collected at each of a plurality of locations 204 along a scan path, e.g., 202a. Thus, when one scan line 202a is completed, the probe is indexed by a distance $\Delta y_1$, in preparation for the next scan line 202b in raster fashion.

Figure 2B:
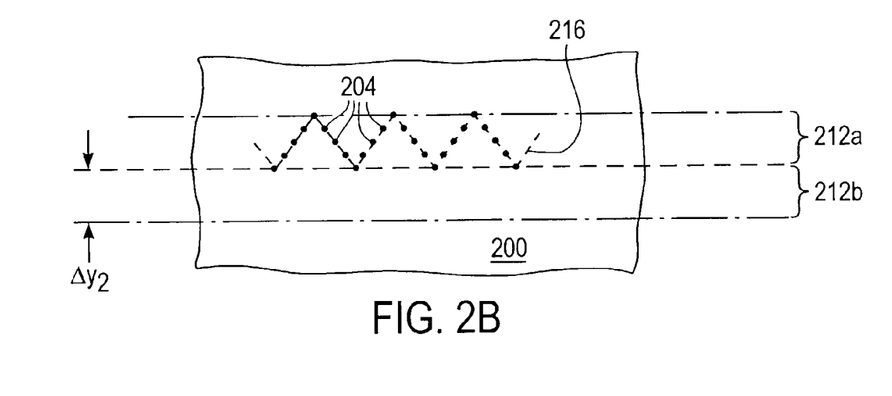
Figure 2C:
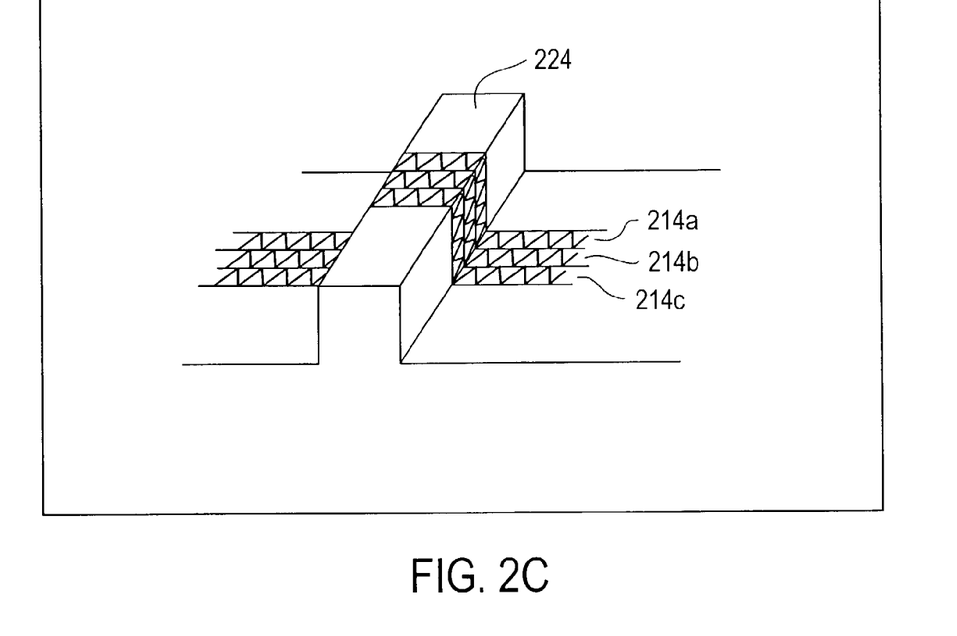
FIG. 2C shows a typical scanning operation in accordance with the invention.

FIG. 2B illustrates merely as an example a scan path 216 generated in accordance with the present invention. The data collection locations 204 which lie along the scan path define a "scan region" (scan area, scan envelope) 212a. When a first scan region 212a is scanned, the probe can be indexed by a distance $\Delta y_2$ in preparation for scanning a second scan region 212b. For example, FIG. 2C shows a scan of a surface performed along a plurality scan paths 214a, 214b, and 214c.

The scan data that is collected can include corresponding information such as location information indicative of the location on the surface being scanned and information indicative of a physical measurement that was collected at that location, such as height information. Conventionally, the location information comprises X and Y coordinates relative to a reference location of the scanner system of the AFM. The origin can be defined to be any point within that space (or theoretically any point even outside that space). Typically easements made by an AFM are 'relative' measurements. They will tell you the distance between structures on a sample, not the absolute position of a structure. However, for the sake of the discussion which follows, a convention can be adopted without loss of generality wherein the location information is referred to as "coordinates." It will be appreciated that the term is not limited in meaning to absolute Cartesian coordinates in an X-Y plane, but rather having the broader conventional meaning as understood by those of ordinary skill in the relevant arts who use AFM systems.

Figure 3A:
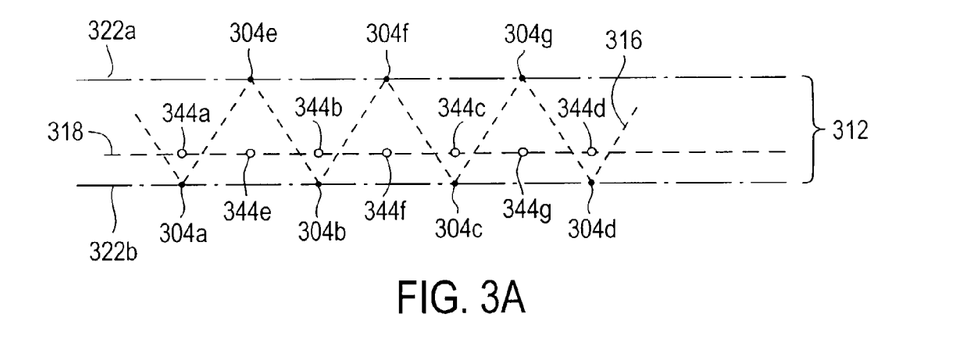
FIG. 3A shows processing of the scan data according to the invention.

Referring to FIG. 3A, the scan data that is collected (e.g., FIG. 2B) is further processed in accordance with the invention. The figure shows a scan path 306 where the data collection locations 304a–304g collectively define a scan region 312. It can be seen that a given set of locations can define two or more boundaries that define the scan region. In the exemplar shown in FIG. 3A, the scan locations 304a–304d can define a boundary 322a and the scan locations 304e–304g can define a boundary 322b. The boundaries in turn can define a scan region 312.

Initially, the scan data is associated with first coordinates representative of the scan locations 304a–304g. In accordance with the invention, some or all of the scan data can be remapped to second coordinates. That is, some or all of the scan data become associated with second coordinates as if that data were collected at the second coordinates. FIG. 3A shows a result of an example of such a remapping. Here, the coordinates associated with the scan data that were collected at the scan locations 304a–304g are shown having been mapped to new coordinates representative of locations 344a–344g. The scan data now appears to have been collected along the scan line 318.

Figure 3B:
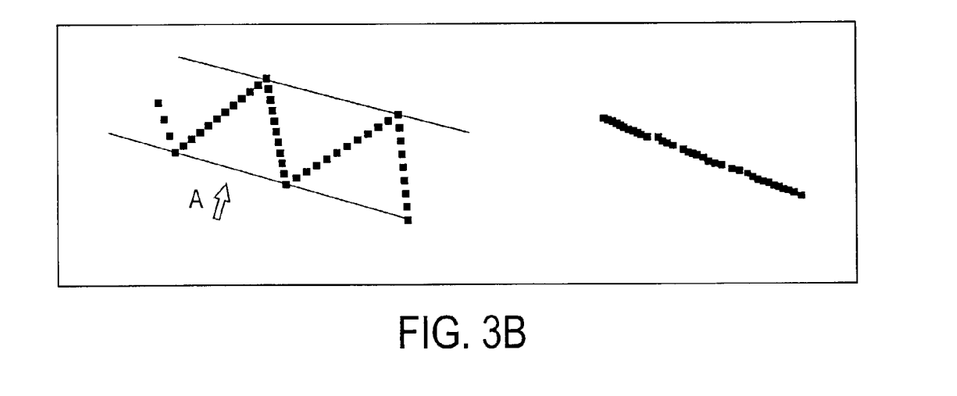
FIG. 3B illustrates a graphical manifestation of the effect of the scan data processed according to the invention.

FIG. 3B shows a graphical manifestation of this mapping process. The left display shows the collected scan data displayed using its true scan location coordinates. The left display shows the zig-zag pattern of the scan. The right display shows the scan data having remapped coordinates, showing now a straight line. The right display can be considered a projection of the left display viewed in the direction of the arrow A.

Figure 3C:
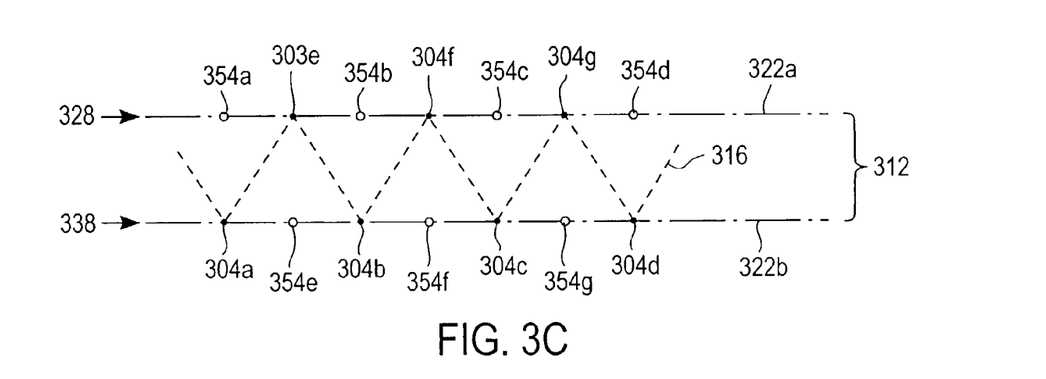
FIG. 3C shows alternate processing according to alternate embodiments of the invention.

FIG. 3C shows exemplars of alternative mappings in accord with the present invention. It can be seen that not all of the scan data are necessarily remapped. As shown in the figure, only some of the scan data can be associated with new coordinates. For example, the scan data collected at scan locations 304e–304g, only, can be associated with new coordinates. Thus, the scan locations 304e–304g are shown mapped to locations 354e–354g, which lie along the boundary (periphery) 322b. In this case, the scan data now appear to have been collected along a scan line 338, which happens to coincide with a boundary of the scan region 312.

FIG. 3C also shows that the scan locations 304a–304d can be mapped to new locations 354a–354d, lying along boundary 322a. In this case, the scan data would appear to have been collected along a scan line 328. In accordance with the invention, the mapping can be made to any set of second coordinates such that the new scan line can lie within the scan region, on portions of the periphery of the scan region, or outside of the scan region (e.g., FIG. 7C shows a segment 370 which lies outside of a scan region 712).

It can be appreciated that the mapped scan data no longer accurately represent the locations of the physical features present on the surface. It was discovered, however, that information about the surface features were nonetheless preserved sufficiently to determine the presence of the features. More significantly, the existence of such features can be determined more quickly than by conventional raster scans. This will become apparent from the discussion which follows.

Figure 4:
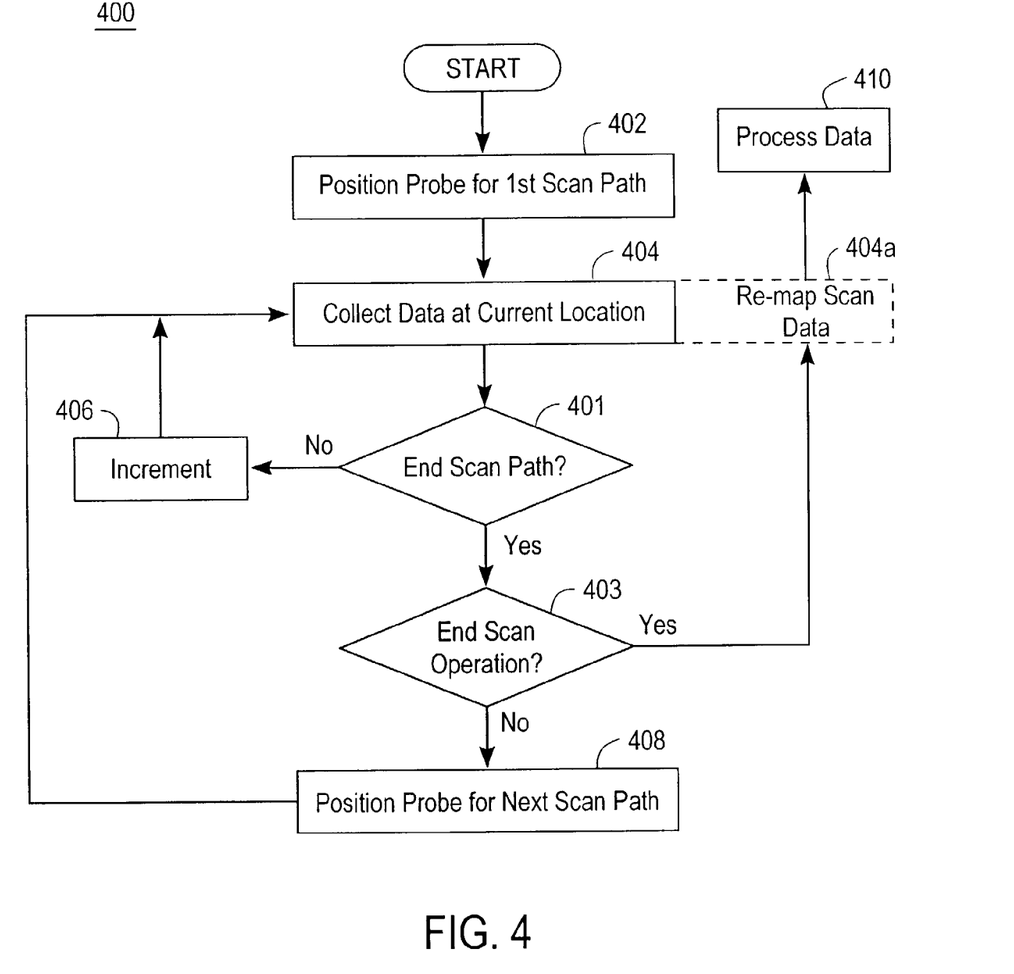
FIG. 4 is a flow chart highlighting the salient operations according to the invention.
Figure 5:
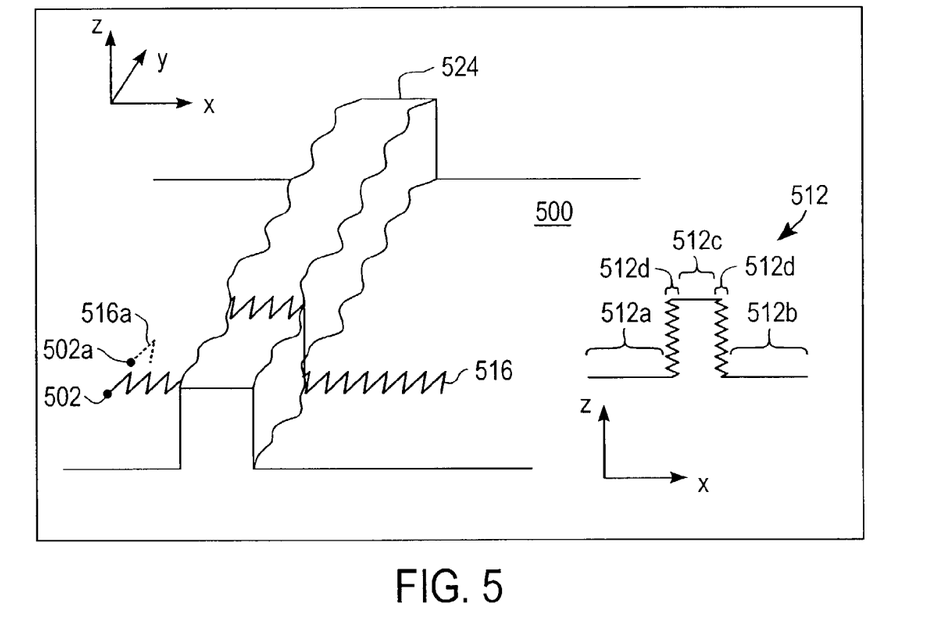
FIGS. 5 and 6 illustrate additional examples of data collection operations performed in accordance with the invention.

FIGS. 4 and 5 show a scan performed in accordance with the invention. The flow chart 400 shown in FIG. 4 highlights the control and processing for a scan data collection operation performed in accordance with the invention. A scan is shown in FIG. 5. In this example, sidewalls of a surface feature 524 have variations in them. Typically, the control and processing can be implemented using appropriate hardware, software, and/or combinations of the two in the controller 102 shown in FIG. 1. However, it can be readily appreciated that many other implementations are possible, depending on the specific hardware being used and on various operational and system constraints.

In a step, 402, the probe 104 can be positioned at a point 502 of a surface 500 to be scanned, to begin the scanning process. Data collection is performed in a step 402. The scan data can be accumulated in the data store 108 for subsequent processing. In addition, location information indicative of the position where the data was collected can be stored along with the scan data.

A check is then made in a step 401 to determine whether the end of the scan path has been reached. If not, the probe is then "incremented" to the next data collection position, in a step 406. Data collection is then performed at this next location, step 404. This process is repeated until in step 401, it is determined that the end of the scan path 516 is reached.

In the scan shown in FIG. 5, the incrementing will attempt to follow the zig-zag path 516, along which scan data is collected. However, the presence of surface features can affect the trajectory of the scan path. This is the case in FIG. 5 where the wavy surface of the feature 524 will affect the X-direction motion as the probe follows the surface undulations. It is noteworthy at this point to observe that the flowchart steps are merely illustrative of the actual control and data collection that occurs. In actuality, data collection is constantly occurring. For example, in the case where the data of interest is height information, the Z-direction of the probe 104 is constantly being adjusted as the probe is translated across the surface 500. Consequently, information indicative of height is always available. The controller software will take a sample of the probe height at specific times, based on the location of the probe. Thus, when the probe has been translated along its scan path to a location designated as a data collection location, the controller software (or the like) will sample the probe height information and store it along with the location.

Continuing with FIG. 4, when the scan path is complete, a decision is made in a step 403 whether the scanning operation is complete. If not, then the probe is positioned in a step 408 to a second starting location 502a on the surface 500, to begin a scan along the next scan path 516a. The process of collecting data (step 404) and incrementing (401, 406) is then repeated for the next scan path.

When it is determined in step 403 that the scan operation has completed, the stored scan data can be re-mapped, in a step 404a, to a different set of coordinates as illustrated by the examples shown in FIGS. 3A and 3C. Thus, for example, data collected along scan paths 516, 516a can be mapped to lines within the respective regions defined by the san paths.

A subsequent data processing step 410 can then be performed on the re-mapped scan data as if the data was collected at the new coordinates. For example, conventional analytical techniques can be applied to identify features such as widths of structures, to measure roughness of sidewalls, to determine general roughness metrics, to identify/determine side angles of structures, to measure the curvature of the top or bottom of the transitions on a structure, to identify variations from a normal (perfect) surface, top identify bulges on the sides of structures, to measure undercut dimension variations, and so on.

FIG. 4 shows that the re-mapping step 404a can be performed during the data collection step 404 rather than at the end of the scan operation. It can be appreciated that such real-time remapping can be easily realized with suitable programming and/or control logic. Furthermore, since the collected data is "offline" in that it is already stored in a data store, the mapping operation can be done at any time during or after the scan operation; e.g., at every data point, after each scan line, after the entire scan operation, etc. It may be advantageous for a given situation to perform a mapping of groups of collected data and alter the scan path based on a running analysis of the remapped data. Thus, in step 406 the increment direction can be based on the collected data, the original location of the collected data, the remapped locations, and so on.

FIG. 5 illustrates a data collection operation of a scan in accordance with the invention. Here, the data collection scan paths 516, 516a can be, for example, linear zig-zags. The collected scan data originally will comprise location information that can be represented by coordinates, e.g., X- and Y-coordinate pairs. The Z-direction information can be considered to be location information, but is typically treated as a measurement of a physical characteristic at a particular location on the surface being scanned and thus is not regarded as location information, but rather a data point. In a particular implementation, the scan data is mapped to have the same Y-coordinate while preserving the original X-coordinate. For example, suppose a set of scan data is collected along a scan path defined by:

$(X_1, Y_1), (X_2, Y_2), (X_3, Y_3), (X_4, Y_4), (X_5, Y_5)$.

The Y-component of the particular scan path exemplified in FIG. 5 oscillates between two values. The X-component of the scan path generally increases as the scan proceeds (assuming left-to-right motion is the positive direction). However, as noted above, due to the waviness of the surface of the feature 524, the X-coordinates will vary according to the undulations.

It can be seen that a mapping of the scan data coordinate to the same Y-coordinate while preserving the X-coordinates is represented by the following:

$(X_1, Y_n), (X_2, Y_n), (X_3, Y_n), (X_4, Y_n), (X_5, Y_n)$, where $Y_n$ can be a location somewhere along the scan path. As a consequence of the mapping, the scan data appears to have been collected along a scan line at a Y-coordinate of $Y_n$. Thus, the only "useful" location information is the X-coordinate component.

FIG. 5 shows a plot 512 of Z-values vs. X. The segments 512a and 512b represent the data collected along the surface 500, showing the probe moving in a steady left-to-right direction. The segment 512c shows a similar steady left-to-right movement, albeit at a higher Z-level as the probe scans across the flat top surface of the feature 524.

The segments 512d, however, indicate a zig-zag movement of the probe. The left segment 512d corresponds to the probe scanning the left surface of the feature 524 (similarly, the right segment 512d corresponds to a scan of the right surface of the feature). This oscillating component in the X-direction results from the zig-zag trajectory taken along the wavy surface of the feature during the data collection operation. By comparison, a single scan performed in the conventional manner shown in FIG. 9D shows only the height of the feature 924 as the Z-value changes. The existence of variations on the surface of the feature 224 such as waviness cannot be detected without making multiple scans using conventional scanning. However, performing a multitude of scans is a time consuming operation that is preferably avoided. On the other hand, collecting data in accordance with the invention can reveal the surface variations of the feature 524 in fewer (perhaps a single) pass, albeit along a slightly longer path, which typically takes much less time to perform.

Figure 6:
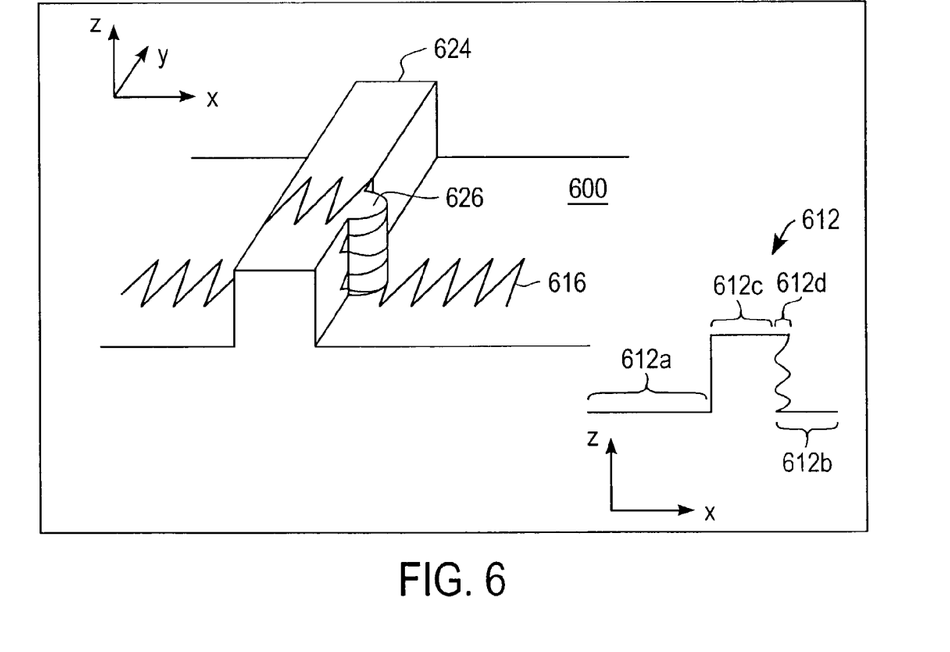

As another example, consider the data collection operation shown in FIG. 6. Here the surface 600 includes a feature 624 which has a "bump" or protrusion 626. A zig-zag scan pattern 616 can be used for the scanning operation. The collected scan data is remapped as discussed above, and the Z-value measurements are plotted against X to produce a plot 612.

It can be seen that segments 612a and 612b show a steady left-to-right translation of the probe as it scanned the surface 600. Similarly, a steady left-to-right translation can be seen in segment 612c of the plot as the probe is translated across the top surface of the feature 624. In FIG. 6, the left surface of the feature is substantially flat. Consequently, the zig-zag trajectory along the left surface does not vary the X-direction motion of the probe. This can be seen more clearly in FIG. 2C, where the trajectory of the zig-zag scan pattern can be seen on the right surface of the feature 224.

Returning to FIG. 6, when the remapping is performed, a Z-X plot 612 shows a step transition between segment 612a and segment 612c. However, the oscillatory motion shown in segment 612d indicates the presence of the bump 626. Again a conventional scan (e.g., FIG. 9C) could miss the bump 922 entirely, if the scan index is too large. However, even if the scan index was small enough, a single linear scan would not be enough to detect the feature. Conventional scanning would require multiple scans to collect sufficient data to allow detection.

In the foregoing examples, a linear scan path has been used in the scanning operations. It can be appreciated by now that the present invention contemplates the use of any arbitrary scan path. Generally, any locus of data collection locations, no matter how complex, whose motion can be predicted and is well behaved (i.e., consistently reproduced by the scanning system) can be used.

Figure 7A:
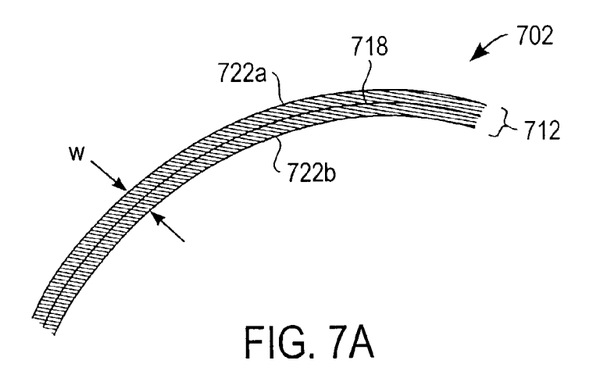
FIGS. 7A–7C show generic scan paths according to the invention.
Figure 7B:
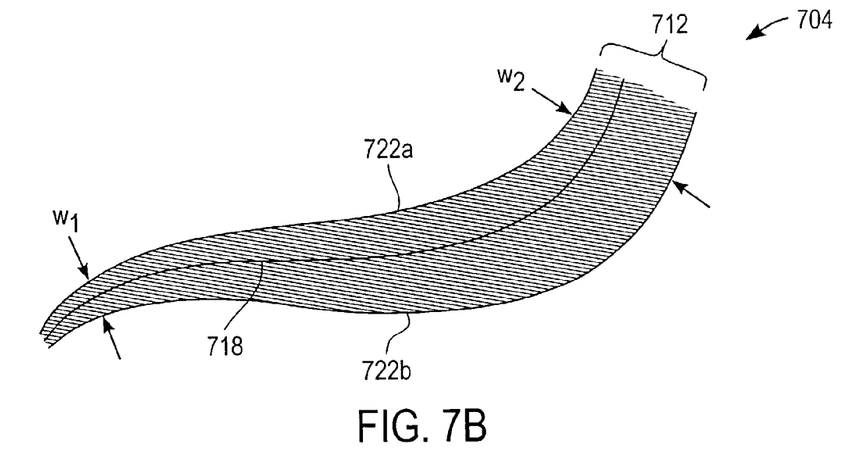
Figure 7C:
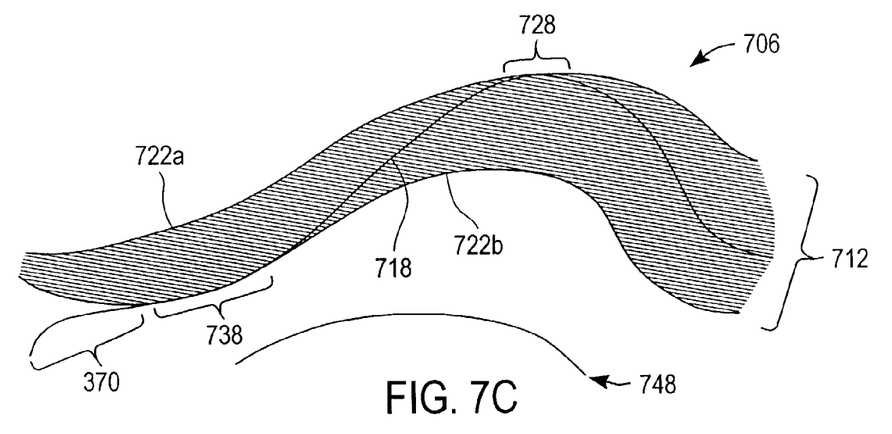

FIGS. 7A–7C illustrate this aspect of the invention. For example, in FIG. 7A, a scanning operation can be performed using a curved or arced scan path 702. The scan pattern which defines the scan region 712 can be characterized by a zig-zag pattern that follows a generally curved trajectory. The collected scan data can then be mapped to a line 718 that follows the generally curved trajectory of the scan path 702.

Figure 8A:
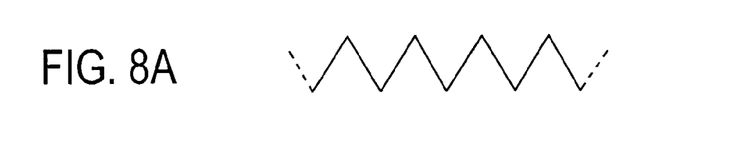
FIG. 8 shows various scan patterns.
Figure 8B:
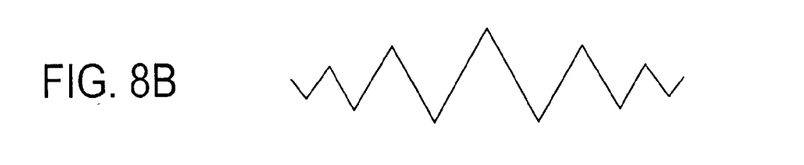
Figure 8C:
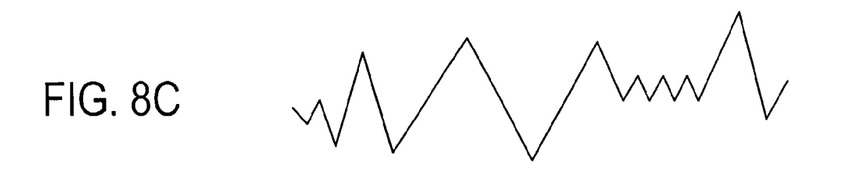
Figure 8D:
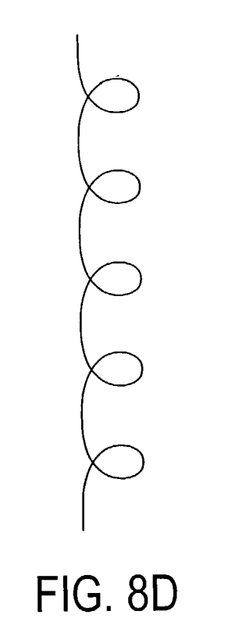

The scan pattern has been depicted as a zig-zag pattern for convenience. The zig-zag pattern can be regularly spaced (e.g., FIG. 8A), or have various forms of irregular spacing (e.g., FIGS. 8B and 8C). Other patterns are possible; for example, FIG. 8D shows a circular pattern. More generally, however, it can be appreciated that a scan pattern can take the form of any arbitrary pattern.

Figure 8E:
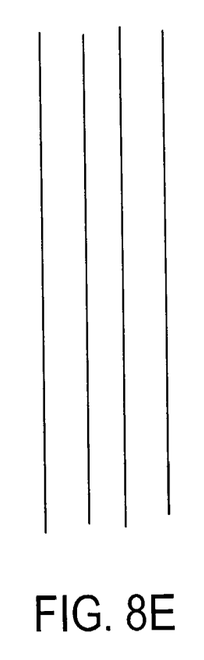
Figure 8F:
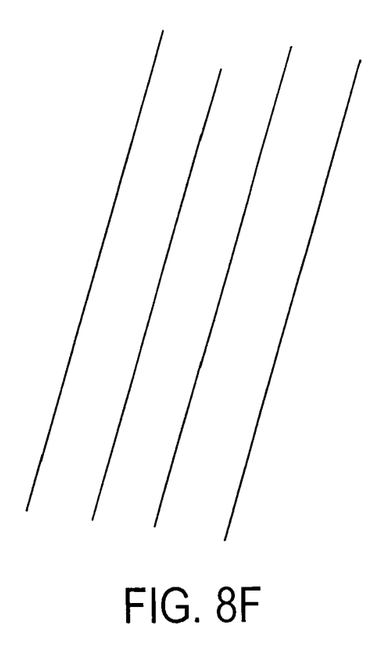
Figure 8G:
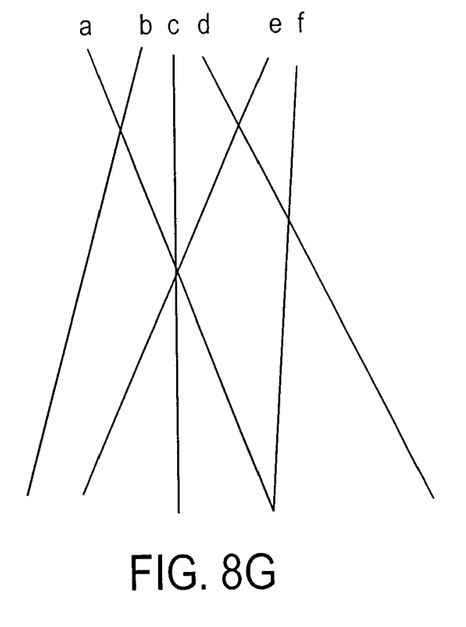

In addition, the path of the scan need not be perpendicular such as illustrated for example in FIG. 8E where the path is shown as a straight line, it being understood that the scan pattern can be any arbitrary pattern as explained above. In general, scan paths can follow trajectories independent of the other paths. This is illustrated in FIG. 8F, for example, where the trajectory of the paths represented by the straight lines are at an angle that is not perpendicular to either the X axis or the Y axis. FIG. 8G more dramatically illustrates that the scan paths ('a' through 'e') need not be parallel to each other, but rather can follow trajectories independent of each other.

FIG. 7A shows a scan path that has a constant spacing W between the boundaries 722a, 722b of the scan region 712. However, as can be seen in FIG. 7B, a scan path 704 can cover a scan region 712 which boundaries 722a, 722b do not have a fixed spacing, but rather a varying spacing where for example, the separation between the boundaries might be $W_1$ at a first location and might be $W_2$ ($\neq W_1$) at a second location.

FIG. 7A indicates that the locations to which the scan data are remapped can be to a line that is equidistant from both boundaries 722a, 722b. FIG. 7B indicates that the locations to which the scan data are remapped can be to a line that is not equidistant from both boundaries 722a, 722b.

FIG. 7C indicates further that the line to which the scan data are remapped do not have to bear any relation to the scan region 712 or its boundaries 722a, 722b. For example, the line to which the scan data are remapped can coincide entirely with a boundary or partially, such as segment 728 or segment 738. The line can lie outside of the region such as segment 370, or line 748 which lies entirely outside of the scan region. FIG. 7C also shows that the line 718 at least partially intersects the scan region, defined for example by a scan path having a zig-zag pattern.

Figure 7D:
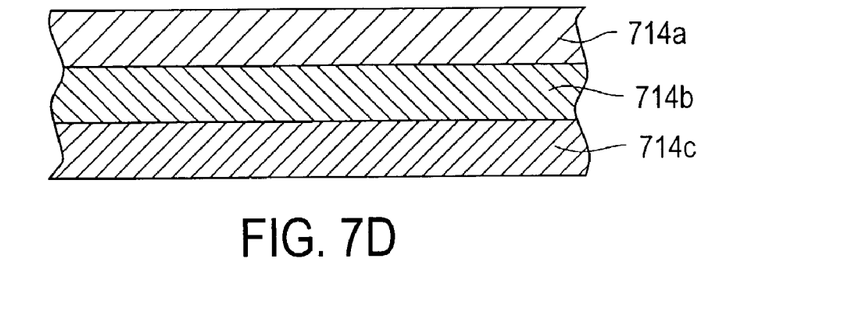
FIGS. 7D–7F show examples of scanning operations.
Figure 7E:
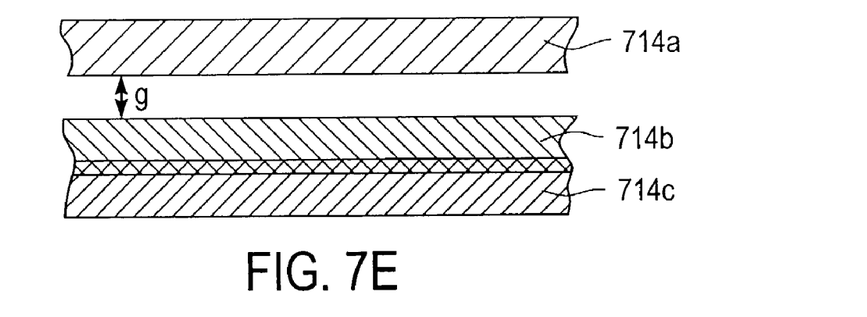
Figure 7F:
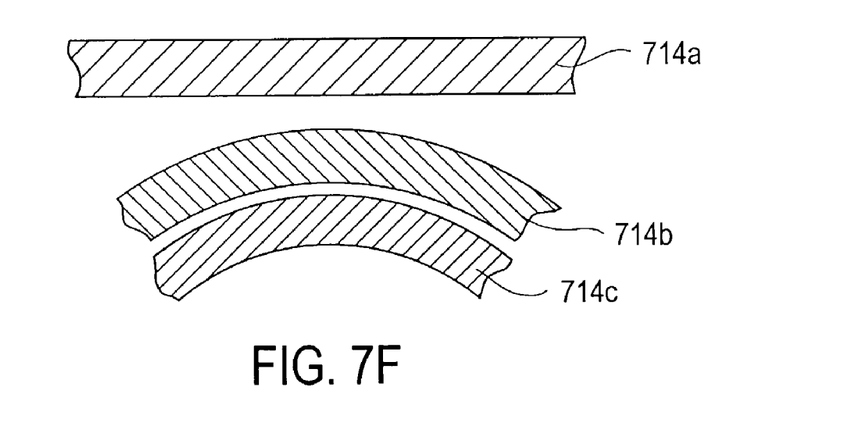

Referring to FIG. 7D, the figure shows successive scan paths 714a–714c to be adjacent one another. It can be appreciated from the foregoing discussions that it is in accordance with the invention that a scanning operation can be performed wherein the scan paths might overlap each other (FIG. 7E, 714b and 714c), or alternatively have a gap (FIG. 7E, gap g) between successive scan paths 714a, 714b. Further with respect to FIG. 7F, it is in accordance with the invention that successive scan paths 714a–714c might have differently shaped scan regions. It is understood that appropriate control mechanisms, hardware and/or software, can be readily implemented to effect such scan operations.

What is claimed is:

1. A method for collecting scan data from an SPM (scanning probe microscopy) system comprising:
moving a probe across a surface in a first pattern of movement, wherein the first pattern is characterized by a set of one or more paths;
further moving the probe across the surface in a second pattern of movement by superimposing the second pattern onto the first pattern, wherein the second pattern is characterized at least by lateral deflections relative to the set of one or more paths; and
collecting scan data, each scan datum comprising first information representative of a physical measurement of the surface and second information indicative of a first location, the first location being the location on the surface where the first information was collected.

2. The method of claim 1 wherein the scan data is collected along a first scan path, the first scan path covering a scan area of the surface, the first location of each scan datum being a location along a first line within the scan area, wherein each second location is a location along a second line different from the first line.

3. The method of claim 2 wherein the scanning operation further includes scanning the probe along a second scan path, wherein the scan data is further collected along the second scan path.

4. The method of claim 3 wherein the second scan path overlaps the first scan path.

5. The method of claim 3 wherein the first scan path is spaced apart from the second scan path.

6. The method of claim 3 wherein the first scan path is differently shaped than the second scan path.

7. The method of claim 2 wherein the second line lies wholly within the scan area.

8. The method of claim 2 wherein the second line lies partially within the scan area and partially outside the scan area.

9. The method of claim 2 wherein the second line lies along a boundary of the scan area.

10. The method of claim 1 wherein the second pattern is a zig-zag shaped pattern.

11. The method of claim 1 wherein the first pattern of movement is a raster scan pattern, and the second pattern of movement is superimposed on the raster scan pattern.

12. The method of claim 1 further comprising, for some of the scan data, altering the respective second information of the scan datum to indicate a second location wherein that scan datum appears to have been collected at the second location.

13. A method for collecting scan data from a scanning probe microscopy (SPM) system comprising:
performing a plurality of raster scans laterally relative to a surface to be scanned including alternating between displacing a probe relative to the surface along a scan direction and displacing the probe relative to the surface along an index direction in order to set up for a subsequent displacing of the probe along the scan direction; and
while displacing the probe along the scan direction, moving the probe in an oscillatory fashion laterally relative to the surface to be scanned.

14. The method of claim 13 as used in any one of atomic force microscopy (AFM), scanning tunneling microscopy (STM), near-field scanning optical microscopy (NSOM), nanospectral photometry (NSP), nanopolarimetry (NP), or magnetic field microscopy (MFM).

15. A method for collecting scan data from a scan area of a surface by moving a probe laterally relative to the surface comprising:
producing lateral oscillatory motion in the probe;
while the probe is oscillating laterally, performing a first scan operation by displacing the laterally oscillating probe from a first end of the scan area to a second end of the scan area;
indexing the probe for a second scan operation, where the foregoing is repeated; and
while the probe is oscillating laterally, performing the second scan operation by displacing the laterally oscillating probe from the first end of the scan area to the second end of the scan area.

16. The method of claim 15 wherein said performing a first scan operation includes displacing the laterally oscillating probe along a curvilinear path.

17. The method of claim 15 wherein said performing the second scan operation includes displacing the laterally oscillating probe along a path that is not parallel to the path of the first scan operation.

18. The method of claims 15 wherein the lateral oscillatory motion is a zig-zag motion.

19. A method for collecting scan data in a scanning probe microscopy (SPM) system comprising:
- performing a first scan operation of a scan area on a surface to be scanned, the first scan operation including displacing a probe along a first line of travel from a first end of the scan area to a second end of the scan area;
- during the first scan operation, moving the probe so as to collect scan data at points on the surface other than points on the surface that lie along the first line of travel;
- indexing the probe for a second scan operation, the second scan operation including displacing the probe along a second line of travel; and
- during the second scan operation, moving the probe so as to collect scan data at points on the surface other than points on the surface that lie along the second line of travel.

20. A method of operating an SPM to collect scan data from an area of a surface to be scanned comprising:
- positioning a probe to a start point in the area of the surface to be scanned; and
- scanning the area in raster fashion by moving the probe relative to the surface to be scanned along a line of travel, including:
  - displacing the probe laterally across the surface about the line of travel;
  - collecting data during the scan operation from a region of the area to be scanned that is defined by a first boundary and by a secondary; and
  - indexing the probe to a next point in the area of the surface to be scanned in preparation for a subsequent scan operation.

21. A method of operating an SPM to collect scan data from an area of a surface to be scanned comprising:
- positioning a probe to a start point in the area of the surface to be scanned; and
- performing a raster-fashion scan of the area, comprising alternating between a scan operation and an indexing operation,
- wherein the scan operation includes displacing the probe across a width of the area to be scanned while at the same time collecting data from a region of the area to be scanned, the region being bounded by a first boundary and by a secondary.

* * * * *